June 26, 1956  H. J. BOWER  2,752,164
TANDEM AXLE SPRING SUSPENSION
Filed June 3, 1953  4 Sheets-Sheet 1
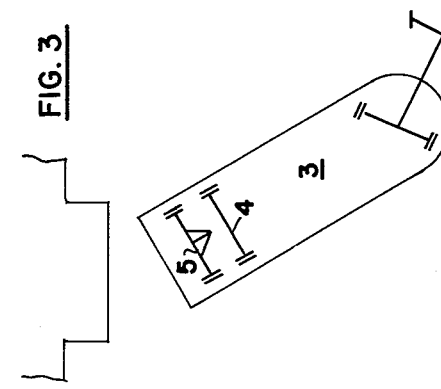
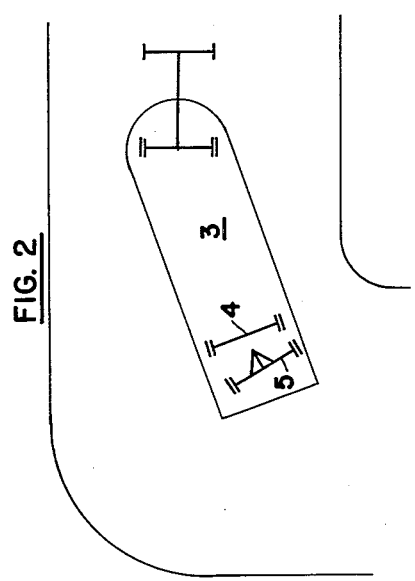
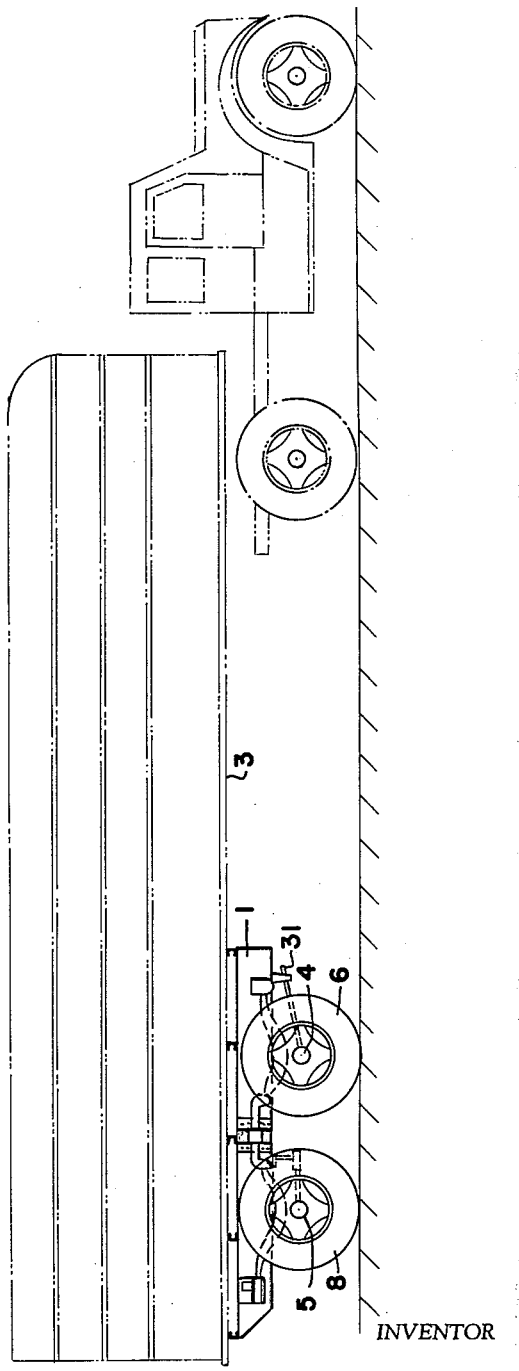
INVENTOR
HARMAN J. BOWER
BY
ATTORNEY June 26, 1956   H. J. BOWER   2,752,164
TANDEM AXLE SPRING SUSPENSION
Filed June 3, 1953   4 Sheets-Sheet 2

INVENTOR.
HARMAN J. BOWER
BY
Thomas W. J. Clark

June 26, 1956     H. J. BOWER     2,752,164
TANDEM AXLE SPRING SUSPENSION
Filed June 3, 1953     4 Sheets-Sheet 3
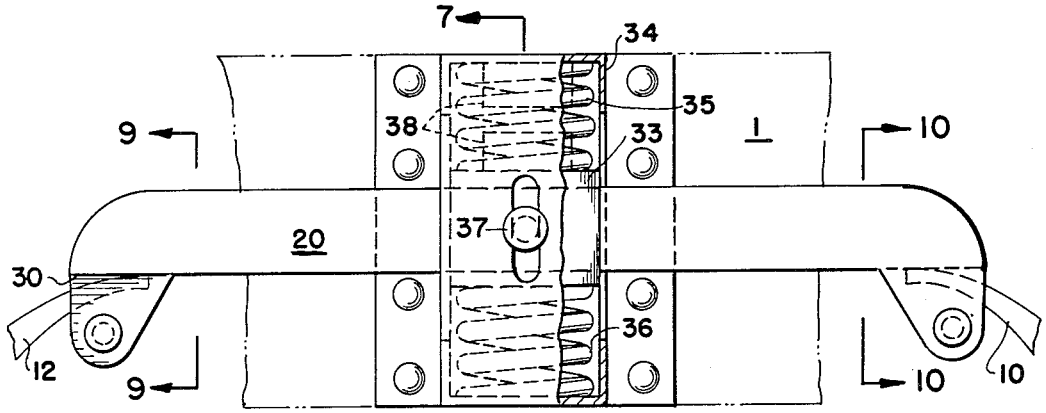
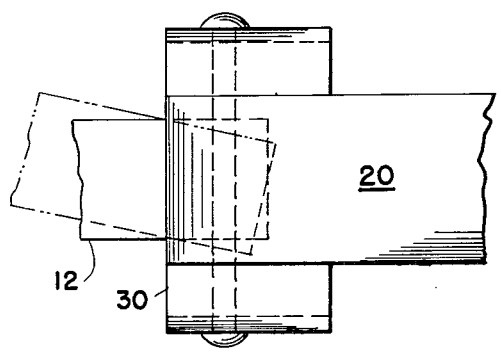
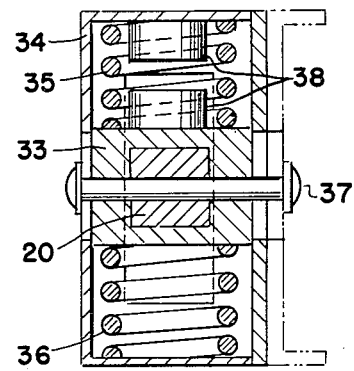
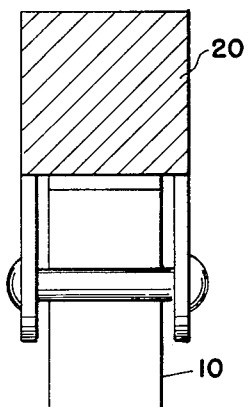
INVENTOR.
HARMAN J. BOWER
BY June 26, 1956  H. J. BOWER  2,752,164
TANDEM AXLE SPRING SUSPENSION
Filed June 3, 1953  4 Sheets-Sheet 4

INVENTOR.
HARMAN J. BOWER
BY
Thomas W. J. Clark

United States Patent Office 2,752,164
Patented June 26, 1956

2,752,164

TANDEM AXLE SPRING SUSPENSION

Harman J. Bower, Roanoke, Va.

Application June 3, 1953, Serial No. 359,405

3 Claims. (Cl. 280—104.5)

The present invention relates generally to land vehicles and in particular to an improved running gear for such vehicles.

The improved running gear is specifically designed for vehicles in which the main load is carried by two sets of assembled wheels and axles such as those generally used for supporting the rear ends of heavy trailers. In the operation of vehicles equipped with this type of running gear, there is a mechanical deficiency in the operation of the wheels whenever its course of direction is changed as in negotiating a curve. This deficiency occurs because all the wheels are fixed to roll in a straight line parallel with the frame of the vehicle to which the running gear is attached. As the forward wheels of a vehicle, which are entirely separate from the present running gear and are some distance in front of the two sets of rear supporting wheels, are turned in either a right or left direction in order to make a turn or curve, the front end of the vehicle will likewise be moved in a corresponding direction, and the rear end of the vehicle will begin to pivot on the rear wheels. If the two rear axles are fixed in parallel relationship, the vehicles will pivot on either one set of wheels or the other, or partly on one set and partly on the other, which is a strain on the various parts of the vehicle and causes a marked degree of tire wear and increased oil or power consumption. It is also more difficult to control the vehicle, particularly on turns and at present driving speeds. With the present invention when a curved course is taken by the vehicle the rear end of the vehicle always pivots on the wheels carried by the fixed forward axle of the rear running gear unit, while the rear axle will move out of parallel relationship with the forward axle to allow the wheels carried thereby to trail the wheels of the forward axle of the unit.

When the two rear axles are close together to lessen tire scuffing and decrease fuel consumption, the load is badly shaken up because faulty road bed construction is transmitted almost directly to the load. When the axles are spaced farther to lessen the injury to the load and to equalize the load on all the axles, greater scuffing and fuel consumption results.

With this invention, a considerable range of axle separation is allowed, so that all the above aims of ease of load carrying, lack of tire scuffing and fuel consumption because of scuffing and dividing the load between the axles are all attained, as well as the vehicle being much easier to control.

The primary object of the invention is to provide an improved vehicle rear running gear that will be flexible enough in the normal operation of a vehicle to eliminate the mechanical deficiencies mentioned and to definitely establish the forward axle of the rear running gear for the vehicle to turn upon when the vehicle is moving either in a right or left direction.

Another object of the invention is to provide such an arrangement as is simple in both its construction and operation.

Still another object of the invention is to provide means for fixing the location of the rear axle of the running gear when the vehicle is moved in a rearwardly direction.

While the principal objects of the invention have been briefly set forth, those skilled in the art will also recognize other objects, uses and advantages of the principles involved as the nature of the invention is more fully disclosed, including its novel construction, combination and arrangement of parts, all of which are shown in the accompanying drawings and described in the following detailed description.

Figure 1 is a view in elevation of the improved running gear illustrating its relative location in respect to the semi-trailer.

Figure 2 is a diagrammatic view of a semi-trailer-truck equipped with this invention regotiating a curve.

Figure 3 is a diagrammatic view of a semi-trailer equipped with this invention being backed into a loading platform.

Figure 6 is a view in side elevation of one of the center spring supports, from the left side of the running gear.

Figure 7 is a sectional view taken along line 7—7 of Figure 6.

Figure 8 is a plan view of the bracket holding the front end of the rear spring.

Figure 9 is a sectional view taken along line 9—9 of Figure 6.

Figure 10 is a sectional view taken along line 10—10 of Figure 6.

Figure 4:
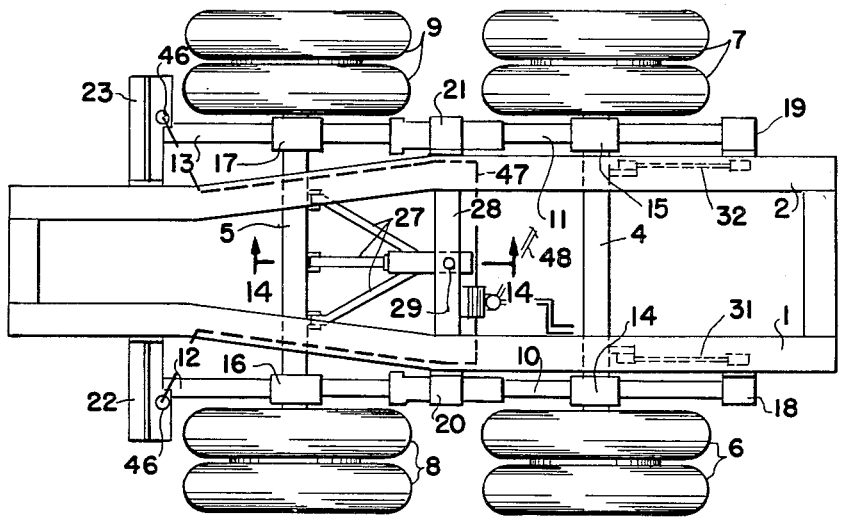
Figure 4 is a plan view of the running gear showing the front and rear axles in parallel position.

In Figure 1 the running gear is shown in its normal location on a trailer-truck and while the frame of the running gear is shown extending only partly along the underside of the trailer, it may extend throughout the entire length of the body.

Referring in detail to the structure of the improved rear running gear, there is provided a pair of upper frame members 1 and 2 which are connected to and support a vehicle bed, or body 3. Located beneath the upper frame members 1 and 2 are a pair of axle members 4 and 5 arranged in tandem relationship. Rotatably mounted on the outer ends of each of the two axles is a pair of wheels 6, 7, 8 and 9. Between the sets of wheels and fixedly secured to the axles are two pairs of semi-elliptical springs 10, 11, 12 and 13. These springs are fixed to the axles adjacent their center by appropriate clamps 14, 15, 16, 17. The outer ends of each of the two sets of springs extend upwardly toward the frame. Secured to the frame members 1 and 2 and extending outwardly therefrom are spring supporting members 18, 19, 20, 21, 22 and 23 of such size and proportion as to receive the outer ends of the springs. All of the ends of the springs are so supported in the springs supporting members as to be capable of giving to the springs a hinging action vertically. The axle 4 which is the forward axle of the tandem pair is fixed not to turn with respect to the frame and is only capable of vertical movement relative to the frame by the action of the springs. However, the rear axle 5 of the tandem pair is arranged to have, in addition to the vertical motion, a limited side swinging movement when a side strain is put on the running gear, or under-carriage, when the front end of the vehicle makes a right or left movement.

Figure 5:
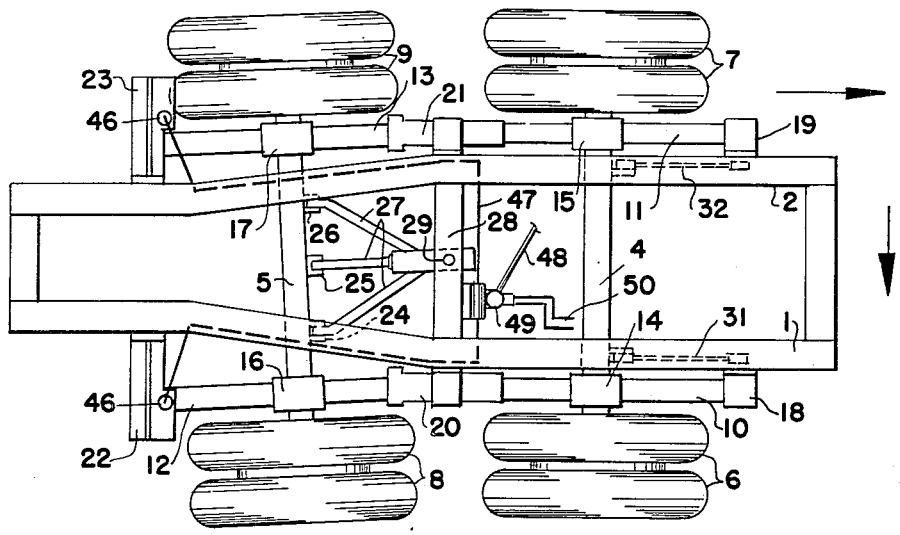
Figure 5 is a plan view of the running gear similar to Figure 4 showing the rear, or trailing axle moved out of parallel relationship with the front axle.
Figure 11:
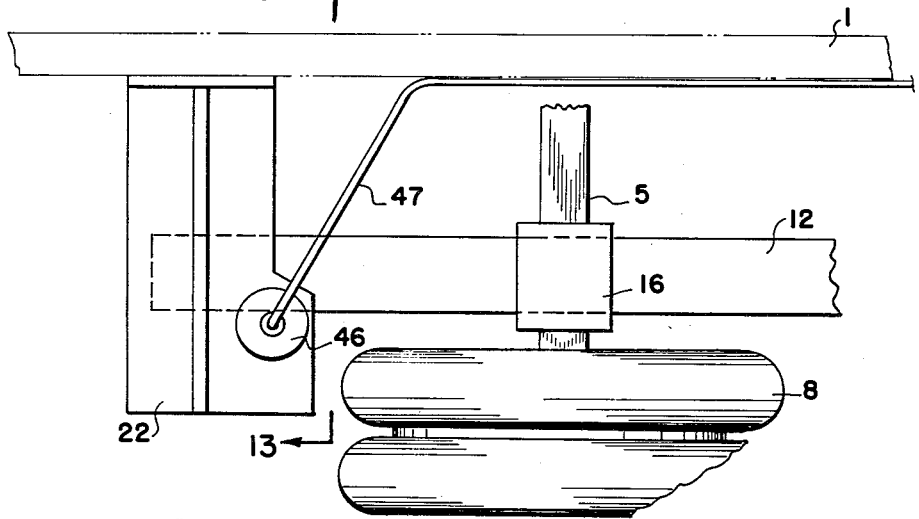
Figure 11 is a fragmentary plan view of one of the rear wheels and springs illustrating the means for controlling the lateral movement of the rear end of the rear spring.
Figure 12:
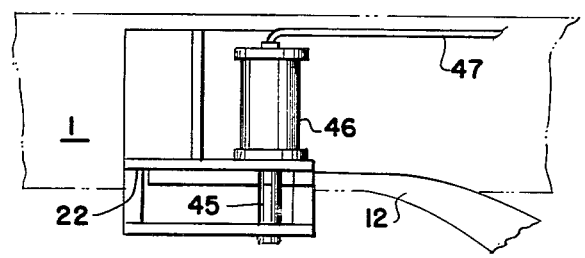
Figure 12 is a vertical view of the same looking from the side of the vehicle.
Figure 13:
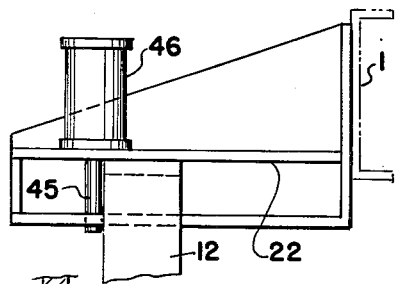
Figure 13 is a view similar to Figure 12 looking toward the rear of the vehicle, from line 13—13 of Figure 11.

The rear axle 5 of the carriage will normally trail parallel with the forward axle 4, while the vehicle is moving in a forward straight line, due to the manner in which it is connected to and supported upon the frame. The axle 5 is provided with means 24, 25 and 26 on its forward side into which are hinged the radius rods 27. These radius rods are provided with a single pivot arrangement adjacent their froward ends for pivotally connecting the front ends of the radius rods to the frame. Extending between the frame members 1 and 2 is a cross member 28. This member 28 is located substantially half way between the two axles when they are in parallel relationship. Located centrally of the member 28 is a pin 29 for pivotally connecting the forward ends of the radius rods 27 to the cross member 28. By this arrangement, when the vehicle is moved in the direction of the two arrows in Figure 5, the vehicle will turn on the wheels 6 and 7 which will move the frame members 1 and 2 in the rear of axle 4 to the left. This moves the cross member 28 to which the radius rods are connected to the left, which will in turn move the axle 5 out of parallel relationship with the axle 4 in a direction that will cause the rear wheels 8 and 9 to tract the front pair of wheels 6 and 7 as illustrated in Figures 2 and 5. In order to allow for the swinging movement of axle 5, the front ends of springs 12 and 13 bear against widened supports 30 on members 20 and 21 provided with side guides 30' as shown in Figures 8 and 9. The rear ends of springs 12 and 13 are supported upon the members 22 and 23 fixedly attached to frame members 1 and 2, in the form shown in detail in Figures 11, 12 and 13. The rear ends of the rear springs are allowed to move laterally along the under surface of the members 22 and 23 as the wheels 8 and 9 and axle 5 swing to track the wheels 6 and 7 when the vehicle rounds a curve.

Rods 31 and 32 connect axle member 4 to frame members 1 and 2 respectively.

Figures 6 and 7 relate to the detail construction of one of the central spring supports located on each side of the frame and designated as 20 and 21. The central spring supports support the rear ends of springs 10 and 11 and the front ends of springs 12 and 13. Each support, prior to welding on the end guides, is passed through a block 33, which floats in a housing 34, between two coiled compression springs 35 and 36, which are located within the housing 34. The support is held in the block 33 by pin 37, and the housing is riveted to member 1. When the trailer is loaded, the two center blocks 38 contact and take the load. When the trailer is empty, the springs absorb the vibration.

Figure 14:
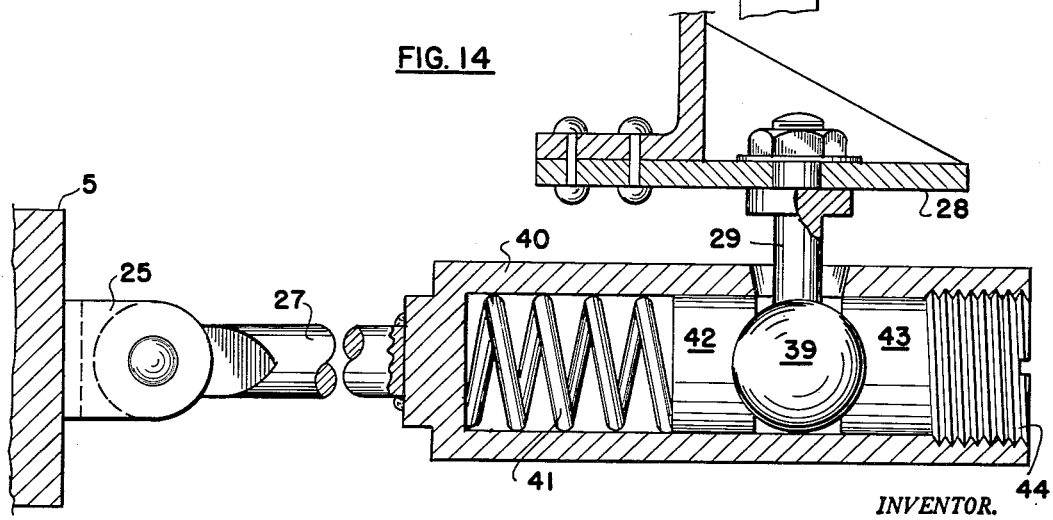
Figure 14 is a sectional view of the swivel mechanism for the rear axle on line 14—14 of Figure 4.

Figure 14 shows a detail of the pivot connection for the forward ends of radius rods 27, the specific arrangement referred to in Figures 5 and 14 consists of a pin 29 having a round head 39 extending downwardly from the cross-brace 28 and a particularly formed means for engaging the head, which comprises a tubular member 40 to which is welded the front ends of the three radius rods. There is provided within the hollow opening of the member 40, a compression spring 41. Placed against the spring 41 is a plug 42 having a semi-circular face extending outwardly to engage the round surface of the member 39. There is also a second semi-circular faced plug 43 facing in the opposite direction and adapted to engage the opposite side of the ball 39. The outer end of the plug 43 is threaded at 44 and is adapted to be threadedly engaged by the outer end of the member 40, as shown in Figure 14. This arrangement as stated before will allow the rear wheels and axle to swing from side to side depending upon the side movement of the rear portion of the running gear by a turning movement of the vehicle.

When the vehicle is to be backed, or moved in a rear-ward direction, the rear axle 5 must be fixed parallel with the axle 4. This is accomplished by means of pins 45. When the vehicle is to be operated in a forward direction these pins are raised or released from action and the rear ends of springs 12 and 13 are then free to move laterally. However, when the vehicle is to be backed pins 45 are moved into the path of the spring ends and at a point when both axles 4 and 5 are parallel. Pins 45 may conveniently be operated from the cab of the vehicle by fluid power, the pins being rods attached to pistons mounted for forcible projection in fluid cylinders 46.

Fluid pressure is supplied to cylinders 46 through lines 47 from the pressure lines 48 of the trailer, as it is used for the trailer brakes. A solenoid operated valve 49 lets pressure into lines 47. The solenoid valve 49 is operated through electric lines 50 from the cab of the tractor.

Figure 2 illustrates diagrammatically the manner in which the rear wheels of the trailer track the front wheels of the running gear when the vehicle is rounding a curve. It is noted that the axle 4 is the one that is always perpendicular to the longitudinal axis of the vehicle, and that axle 5 is allowed to swing laterally when the vehicle is moving forwardly and its front end is moved either to one side or to the other.

Figure 3 illustrates diagrammatically the vehicle when in a backing movement, the axle 5 is locked in place by the pins 45 to keep the axle parallel with axle 4.

While a preferred form of the invention has been shown and described in detail, other modifications may be resorted to which would include the improved principles illustrated herein, however the scope of the invention is defined in the appended claims.

What is claimed as new and is desired to be secured by Letter Patent is:

1. A running gear for the rear end of trailers comprising a frame, a front and rear axle arranged in tandem relationship carried below the frame, wheels mounted outwardly on each end of each of the two axles, radius rods having their front ends connected to each other and pivotally connected to the frame and their rear ends hingedly connected to the rear axle, semi-elliptical springs connected intermediate their ends to the front axle, means on the frame for longitudinally slidably supporting the front ends of said springs and for preventing lateral movement thereof, a pair of semi-elliptical springs fixedly connected intermediate their ends to the rear axle, a rigid equalizer bar pivotally mounted in the frame between and slidably supporting adjacent ends of the front and rear springs, said equalizer bar having depending guide flanges on each side of the said spring ends, the guide flanges for the front spring preventing lateral movement of the front spring, the guide flanges for the rear spring being spaced therefrom to permit lateral swinging movement of the rear spring upon lateral movement of the axle, means on the frame for slidably supporting the rear ends of the rear springs for individual transverse and longitudinal movement, the frame between the wheels on the rear axle being substantially spaced from said rear axle wheels to clear the wheels upon their lateral movement relative to the frame.

2. In a vehicle as claimed in claim 1, including means to fix the rear ends of the springs against lateral movement to maintain the two axles parallel.

3. In a vehicle as claimed in claim 1, including stops settable in the path of lateral movement of the rear ends of the springs to maintain the two axles parallel, and means to remove said stops.

References Cited in the file of this patent

UNITED STATES PATENTS

| | | |
|---|---|---|
| 2,272,572 | Merry | Feb. 10, 1942 |
| 2,361,166 | Ayers | Oct. 24, 1944 |
| 2,401,687 | Letzkus | June 4, 1946 |
| 2,577,322 | Frazier | Dec. 4, 1951 |
| 2,624,593 | Stover | Jan. 6, 1953 |